United States Patent
Hahn et al.

(10) Patent No.: US 11,473,632 B2
(45) Date of Patent: Oct. 18, 2022

(54) ACTUATING DEVICE WITH DIRT SHIELDING

(71) Applicant: ZF FRIEDRICHSHAFEN AG, Friedrichshafen (DE)

(72) Inventors: Stephan Hahn, Bundorf (DE); Fabian Erb, Schweinfurt (DE); Matthias Diemer, Bergrheinfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 311 days.

(21) Appl. No.: 16/755,782

(22) PCT Filed: Sep. 19, 2018

(86) PCT No.: PCT/EP2018/075260
§ 371 (c)(1),
(2) Date: Apr. 13, 2020

(87) PCT Pub. No.: WO2019/076563
PCT Pub. Date: Apr. 25, 2019

(65) Prior Publication Data
US 2021/0190152 A1    Jun. 24, 2021

(30) Foreign Application Priority Data
Oct. 17, 2017    (DE) .................. 10 2017 218 512.0

(51) Int. Cl.
*F16D 25/12* (2006.01)
*F16D 13/75* (2006.01)
*F16D 25/08* (2006.01)

(52) U.S. Cl.
CPC ......... *F16D 13/752* (2013.01); *F16D 25/082* (2013.01); *F16D 25/12* (2013.01); *F16D 25/126* (2013.01)

(58) Field of Classification Search
CPC ...... F16D 25/12; F16D 25/126; F16D 13/752; F16D 13/755; F16D 13/757
See application file for complete search history.

(56) References Cited

U.S. PATENT DOCUMENTS 2,971,399 A    2/1961 Roberts
3,430,744 A    3/1969 Oguri
(Continued)

FOREIGN PATENT DOCUMENTS

DE    3206873    9/1983
DE    4100950    7/1992
(Continued)

OTHER PUBLICATIONS

Office Action of the corresponding German Patent Application No. 10 2017 218 512.0.

*Primary Examiner* — Huan Le
(74) *Attorney, Agent, or Firm* — Cozen O'Connor

(57) ABSTRACT

An actuating device for a motor vehicle, including a housing and a multi-part working piston movable in relation to the housing. The multi-part working piston has a main piston and an adjusting piston, which pistons are formed in a manner movable axially with respect to each other to compensate for wear. A clamping device clamps the main piston and the adjusting piston in relation to each other in order to fix an operative length of the working piston. The main piston and the adjusting piston are partial pistons of the working piston. A shielding element for protecting the actuating device from dirt is arranged on the housing and a partial piston or on a first partial piston and a second partial piston or on an adjusting piston and on the clamping device.

12 Claims, 6 Drawing Sheets

(56) References Cited

U.S. PATENT DOCUMENTS

| | | | |
|---|---|---|---|
| 3,828,894 A | 8/1974 | Crossman | |
| 4,617,855 A * | 10/1986 | Wrobleski | F02N 11/10 |
| | | | 200/82 R |
| 6,389,956 B1 | 5/2002 | Corria, Jr. et al. | |

FOREIGN PATENT DOCUMENTS

| | | | | |
|---|---|---|---|---|
| DE | 69306098 | | 6/1997 | |
| DE | 29914060 | * | 9/2000 | F16D 65/21 |
| DE | 60211170 | | 2/2007 | |
| DE | 102007032488 | | 2/2008 | |
| DE | 102006050802 | | 5/2008 | |
| EP | 0074671 | | 3/1983 | |
| EP | 0561506 | | 9/1993 | |
| WO | WO 2014012539 | | 1/2014 | |

* cited by examiner

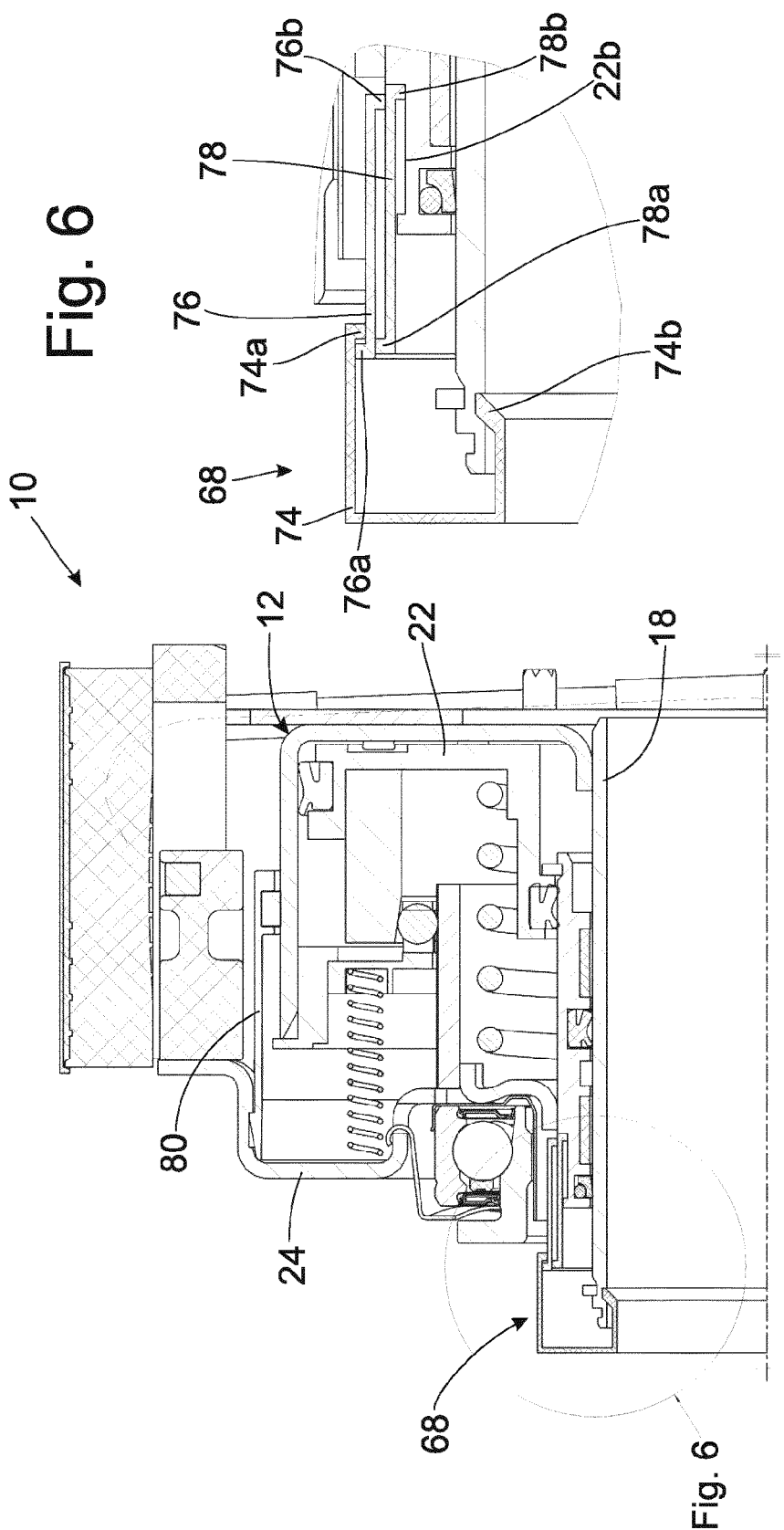

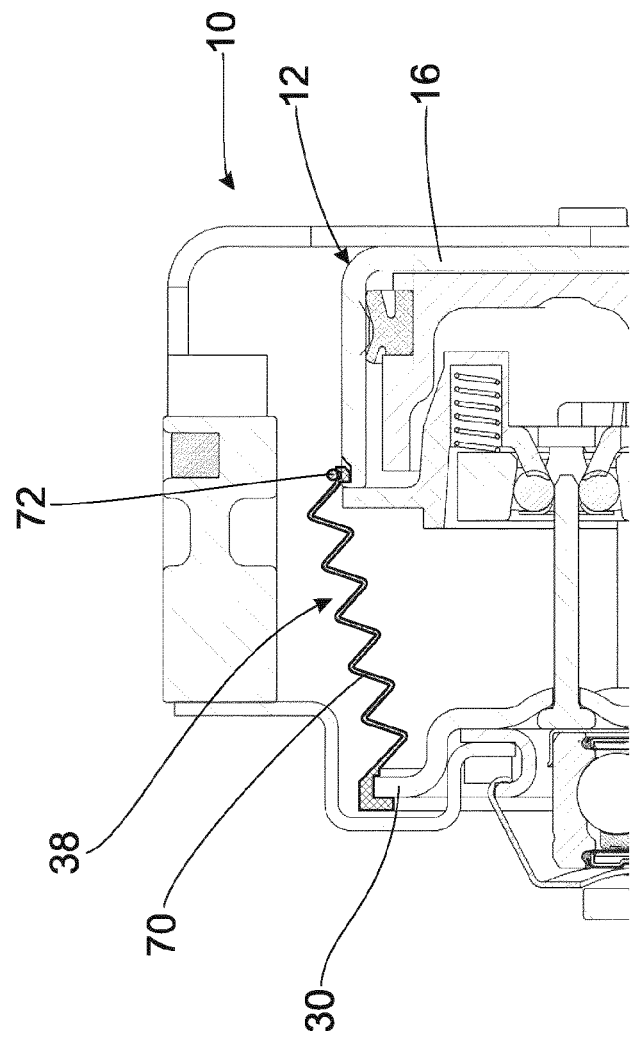

ACTUATING DEVICE WITH DIRT SHIELDING

CROSS REFERENCE TO RELATED APPLICATIONS

This is a U.S. national stage of Application No. PCT/EP2018/075260 filed Sep. 19, 2018. Priority is claimed on German Application No. DE 10 2017 218 512.0 filed Oct. 17, 2017 the content of which is incorporated herein by reference.

BACKGROUND OF THE INVENTION

1. Field of the Invention

The invention relates to an actuating device with dirt shielding.

2. Description of Related Art

Actuating devices that have a wear compensator are known from the prior art. Such a wear compensator usually has a complex mechanism. To ensure the wear-compensating function, this mechanism has to be safeguarded particularly well from penetrating dirt over its entire service life.

SUMMARY OF THE INVENTION

It is therefore the object of one aspect of the invention to provide an actuating device that is particularly well protected from penetrating dirt.

The actuating device is suitable for a motor vehicle, in particular for a commercial motor vehicle. In addition, the actuating device is advantageously designed as a pneumatic actuating device. The actuating device comprises a housing that is of one-part or multipart design, for example consisting of a working cylinder and a guide tube fixedly connected thereto.

Furthermore, a multipart working piston that can be displaced axially with respect to the housing is formed on the actuating device.

The housing and the working piston enclose a pressure chamber that can be filled with a pressure medium to actuate a clutch by axial disengagement of the working piston with respect to the housing. In the case of a pneumatic system, this working chamber is advantageously designed with a very low working volume, which is based on the compressibility of the pneumatic pressure medium. A small working volume accordingly allows quick and comfortable actuation of the clutch. A small working volume is made possible by the use of a multipart working piston. Such a multipart working piston has, inter alia, a main piston and an actuating piston designed to be axially movable with respect to one another for a wear-compensating function. Wear occurring on a friction clutch makes itself noticeable on a friction clutch by a decreasing lining thickness. In the case of a friction clutch, use is customarily made of a diaphragm spring whose diaphragm spring tongues move in the axial direction toward the pneumatic actuating device with increasing wear of the clutch. By virtue of the axial movability of the actuating piston with respect to the main piston, the actuating piston can follow the movement of the diaphragm spring tongues and move into the main piston and thus compensate for the wear of the friction clutch. The correct operative length is set on the working piston by the diaphragm spring-guided relative movement between the actuating piston and main piston. To ensure a permanent bearing contact between the actuating piston and diaphragm spring, in particular via a release bearing, the actuating piston is preloaded in the axial direction with respect to the diaphragm spring, for example by a spring element between the actuating piston and main piston. There is such an amount of space present between the main piston and the actuating piston that the actuating piston can track the wear-compensating movement over the entire wear path of the clutch.

Additionally formed on the actuating device is a clamping device that prevents a relative movement between the main piston and actuating piston during an actuating operation. This clamping device provides a clamping mechanism that brings about fixing between the main piston and actuating piston during an actuating operation, with the result that the axial position between the main piston and actuating piston, and thus also the operative length of the working piston, during the actuating operation remains unchanged. At the end of the actuating operation, the fixing is freed again such that the main piston and the actuating piston can again carry out a corresponding compensating movement with respect to one another.

Such a clamping device is formed for example by a mechanism arranged between the main piston and the actuating piston. Said mechanism is not situated within the working chamber which is shielded from the surroundings via seals.

Accordingly, a shielding element for protecting the actuating device from dirt is formed on the actuating device. This shielding element is advantageously arranged on, in particular fastened to, two components of the pneumatic actuating device. The shielding element correspondingly extends from the first to the second component and shields the enclosed region from penetrating dirt.

The shielding element is advantageously designed to be variable in its length to be able to compensate for a relative movement of the components and nevertheless at the same time to be able to ensure the dirt-shielding function.

In a more general variant, the shielding element is arranged between the housing and a partial piston of the working piston, that is to say the actuating piston or the main piston. For the construction of the working piston by an actuating piston and a main piston, there are various embodiment variants, which all fall hereunder. The various design variants of the working piston differ, inter alia, in the arrangement of the sliding surfaces, that is to say as regard to which partial piston slides on the housing or which partial piston slides on another partial piston.

The shielding element can be arranged in particular between the housing and the main piston. On the housing side, the shielding element is advantageously arranged on a guide tube. This arrangement covers in particular a radially inner region and particularly protects sliding surfaces of the pistons from penetrating dirt. Alternatively or additionally, an arrangement between the housing and working cylinder can shield a radially outer region of the actuating device from dirt, in particular the clamping device.

In another variant, the shielding element is arranged between the housing and the actuating piston. Here, too, a housing-side arrangement on a guide tube is advantageous.

In a further basic arrangement variant, the shielding element can be arranged on two partial pistons, in particular the main piston and the actuating piston. In this way, in particular a sliding surface between two partial pistons is protected from penetrating dirt.

It is also advantageous if the shielding element is arranged, on the one hand, on a partial piston, in particular the actuating piston, and, on the other hand, on an element of the clamping device. As a result, the radially outer region of the actuating device and in particular the clamping device can be optimally protected from contamination.

The arrangement of the shielding element on the aforementioned components can occur directly or else indirectly, that is to say via an intermediate component. It is also possible for a number of the explained variants to be realized simultaneously on the actuating device.

The use of one or more shielding elements on the actuating device ensures good dirt shielding, which allows the wear mechanism to have a service life over the entire surface life of the friction clutch.

Advantageous embodiment variants of the actuating device will be explained below.

It is proposed that the shielding element is designed as a corrugated bellows, as a rolling bellows, or as a telescopic sleeve.

The corrugated bellows provides an elastic shielding element adapted to the axial movement between two components by elastic deformation and provides permanent dirt shielding through its impermeability to dirt.

The rolling bellows has a similar mode of operation as a corrugated bellows. Instead of the concertina effect, the elastic deformation is expressed by rolling up and rolling down of the corrugated bellows. The rolling bellows rolls up or down corresponding to the axial predetermined movement between the two components. A rolling surface is advantageously formed on which the rolling bellows can bear and roll.

The telescopic sleeve can be formed for example by one or more sleeves that are each dimensionally stable per se. A telescopic sleeve correspondingly has one or more sleeves which can slide on an adjacent component or on an adjacent sleeve. The sleeves are displaced with respect to one another to provide uninterrupted dirt shielding by a telescopic movement. The sleeves have corresponding stops which, with an adjacent sleeve or a component, captively engage in one another. The sleeves can thus not fall apart. With particular advantage, two or more sleeves are used on a telescopic sleeve, with the first and the last sleeve preferably being connected captively and fixedly to a respective component of the actuating device.

In an advantageous embodiment variant, the shielding element engages in a securing formation on the respective component.

Such a securing formation can be a groove into which a telescopic sleeve, in particular a sleeve of the telescopic sleeve, snaps. This groove is incorporated by way of example in a guide tube or in an actuating piston, preferably completely peripherally. The sleeve is pushed with its stop onto the respective component until it snaps into the securing formation, that is to say in this case the groove. As a result, captive fastening of the shielding element is ensured. It is also possible for example for an end portion of a rolling bellows or of a corrugated bellows to be arranged on or inside such a securing formation, for example likewise a peripheral groove.

A component advantageously has arranged thereon a supporting element on which the shielding element is captively arranged.

A component can be any component of the actuating device, preferably a partial piston, the housing or else a component of the clamping device. The supporting element accordingly provides an indirect arrangement of the shielding element on the component. It is usually possible as a result to select a simpler geometry or embodiment variant of the shielding element and nevertheless achieve secure fastening to the desired component. For fastening to the respective component, the supporting element can engage for example in a securing formation which has been explained in detail in the previously sections. The supporting element is preferably fastened to a peripheral groove of the component.

In another design variant, the shielding element is captively fastened to the respective component via a securing element.

The securing element ensures permanent dirt shielding. Such a securing element can be designed for example as a clamping ring that comes to bear against a bellows and firmly presses the latter with respect to the component. Alternatively, the securing element can also be provided by a securing ring which engages in a peripheral groove and thus prevents an axial movement of the shielding element beyond the securing ring.

In a particularly advantageous embodiment variant, the telescopic sleeve is formed by a plurality of plastic sleeves.

The plastic sleeves can be produced in a favorable manner and have a sufficient dimensional stability and are additionally impermeable to dirt.

BRIEF DESCRIPTION OF THE DRAWINGS

The actuating device with dirt shielding will be explained below by way of example and in detail on the basis of a number of figures.

FIG. 5 is a pneumatic actuating device;
FIG. 6 is an enlarged portion of the pneumatic actuating device of FIG. 5;
and
FIG. 7 is a detail of a pneumatic actuating device.

DETAILED DESCRIPTION OF THE PRESENTLY PREFERRED EMBODIMENTS

Figure 1:
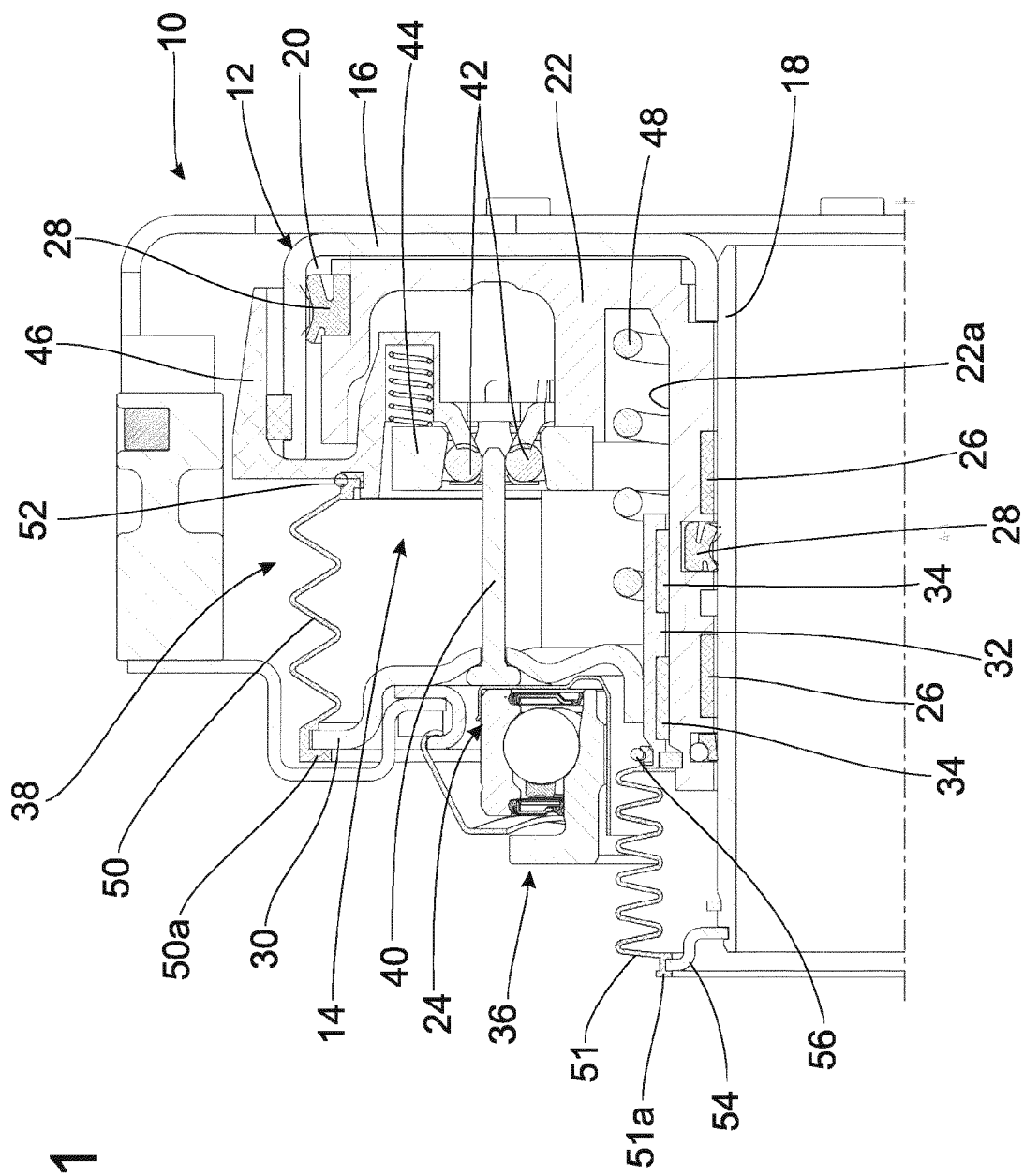
FIG. 1 is a pneumatic actuating device.

FIG. 1 illustrates a pneumatic actuating device 10. The pneumatic actuating device 10 is designed to be substantially rotationally symmetrical, as is also a large part of the components formed on the actuating device 10.

The pneumatic actuating device 10 has a housing 12 and a working piston 14. The housing 12 is of multipart design and comprises a working cylinder 16 and a guide tube 18 fixedly connected to the working cylinder 16. The guide tube 18 is pressed onto the working cylinder 16 and welded thereto in an airtight manner.

The working piston 14 is configured to be axially movable in relation to the housing 12, with the working piston 14 and the housing 12 enclosing a pressure chamber 20. The pressure chamber 20 can be filled with a pneumatic pressure medium, with the result that the working piston 14 is moved axially with respect to the housing 12 and actuates a friction clutch (not shown).

In addition, the working piston 14 is of multipart configuration. It comprises a main piston 22 and an actuating piston 24, which are both designed as partial pistons. The main piston 22 is of one-part configuration and is guided with respect to the actuating piston 24 and can be supported with respect thereto. In addition, the main piston 22 provides a guide in the form of a guide surface 22a for the actuating piston 24, with respect to which the actuating piston 24 can also be supported. Sliding elements 26 are arranged on the main piston 22 within peripheral grooves and allow low-friction axial movability with respect to the guide tube 18.

Sealing elements 28 are formed on the main piston 22 to seal the pressure chamber 20. The sealing elements 28 are arranged in circular peripheral grooves of the main piston 22. One of the sealing elements is arranged radially on the outside of the main piston 22 and is in bearing contact with the working cylinder 16 of the housing 12, while the other sealing element 28 is arranged radially on the inside and is connected to the guide tube 18 of the housing.

The actuating piston 24 is of multipart configuration and has, inter alia, a flange 30 extending in the radial direction and a tubular guide element 32. The guide element 32 and the flange are fixedly connected to one another, in particular by a press connection which is additionally welded in an airtight manner.

The actuating piston 24 is guided by the guide element 32, which can slide along a guide surface 22a of the main piston. For this purpose, sliding elements 34 are arranged within circular peripheral grooves on the guide element 32. The actuating piston 24 can move axially freely with respect to the main piston in the axial direction.

In addition, a release bearing 36 is formed on the actuating piston 24 and interacts with a diaphragm spring (not shown) of the friction clutch. In addition, a positioning sensor system for detecting the axial position of the working piston is arranged by way of example on the pneumatic actuating device 10. This positioning sensor system is sufficiently well known. FIG. 1 illustrates only one position sensor whose position can be determined by sensor electronics (not shown).

A clamping device 38 is formed on the working piston 14, in particular between the main piston 22 and the actuating piston 24. This clamping device 38 ensures fixing between the main piston 22 and actuating piston 24 during an actuating operation of the actuating device. As a result, the working piston is fixed in its operative length during the actuating operation. At the end of the actuating operation, the fixing between the main piston 22 and actuating piston 24 by the clamping device is released such that the partial pistons can again move freely with respect to one another. The working piston 14 is thus adapted in its operating length to the increasing wear of the friction clutch.

The clamping device 38 comprises inter alia, an actuating element 40, a plurality of clamping bodies 42 arranged in two rows in the circumferential direction, a clamping element 44, and a cage element 46.

The actuating element 40 is fixedly connected to the actuating piston 24 and engages in a clamping element 44 or possibly through the latter. The clamping element is fixedly connected to the main piston 22. Between the actuating element 40 and the clamping element, the clamping bodies 42, for example in the form of balls, cylinder rollers, or barrels, are arranged in two rows and uniformly distributed along the circumference. The clamping device 38 can also be configured with a single row of clamping bodies. A single-row embodiment variant is also possible. The cage element 46 ensures that the clamping bodies 42 are limited in their free movability to a space between the actuating element 40 and the clamping element 44.

During an axial movement between the main piston 22 and actuating piston 24, the actuating element 40 and the clamping element 44 also perform a relative movement. As a result, a conical clamping surface of the clamping element is moved toward the clamping body, with the clamping body 42 being secured by virtue of an axial stop, with the result that the clamping body 42 is clamped between the actuating element 40 and clamping element 44 and consequently the free axial movability between the partial pistons 22, 24 is fixed.

At the end of the actuating operation, the cage element 46 establishes a bearing contact with the housing 12 and transfers the stop to the clamping body 42 such that it is released from the clamping and the free movability between the partial pistons 22, 24 is restored.

The pneumatic actuating device 10 additionally has a spring element 48 that preloads the actuating element 24 with respect to the friction clutch, in particular the diaphragm spring, and thus ensures the correct operative length of the working piston 14.

Furthermore, a plurality of shielding elements 50, 51 are formed on the pneumatic actuating device 10. The shielding elements 50, 51 are each secured to two components of the pneumatic actuating device 10.

The radially outer shielding element 50 is secured, on the one hand, to the clamping device 38, in particular to the cage element 46, and, on the other hand, to the flange 30 of the actuating piston 24. The shielding element 50 designed as a corrugated bellows engages radially outwardly around the flange 38 and is fastened to the flange 30 by a radially inwardly directed portion 50a that runs around in the circumferential direction. On the clamping element side, the radially outer shielding element 50 is secured to the clamping device 38 by a securing element designed as a clamping ring 52.

The shielding element 51 situated in a radially inner region of the pneumatic actuating device is secured, on the one hand, to the guide tube 18 of the housing 12 indirectly via a supporting element 54 and, on the other hand, to the guide element 32 of the actuating piston 24 via a clamping ring 56.

The supporting element 54 engages in a circular peripheral groove configured radially on the outside of the guide tube 18. As a result, the supporting element 54 is fastened captively to the housing 12. For the purpose of easier mounting, a ramp which widens radially toward the groove is formed on the guide tube 18. The supporting element 54 is pushed onto the guide tube in a simple manner. Optionally, the supporting element 54 can have a slotted design for this purpose.

The shielding element 50 has a u-shaped receptacle 51a that engages around the supporting element 54 over the entire circumference and is thus fastened captively thereto.

Figure 2:
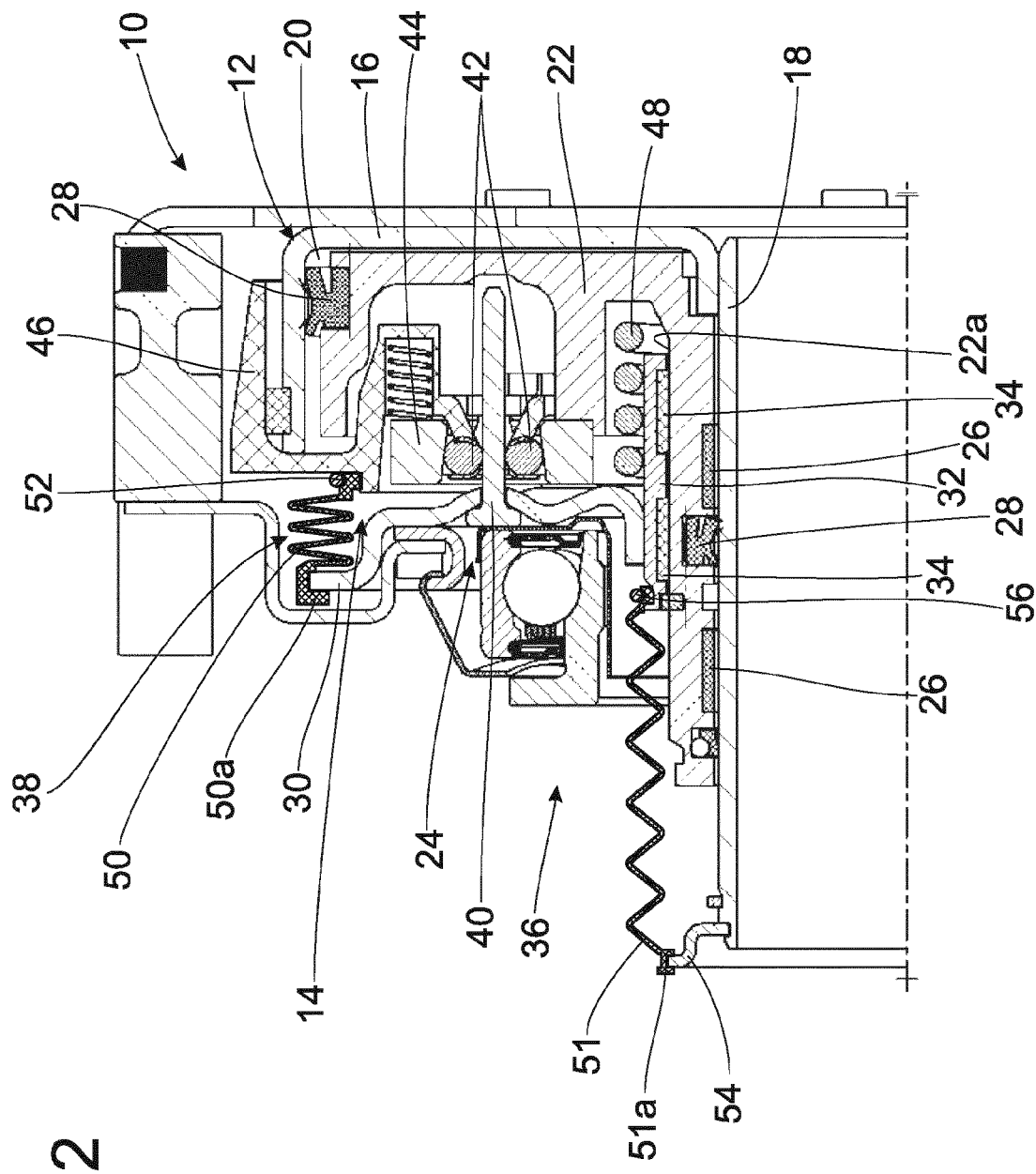
FIG. 2 is a pneumatic actuating device.

The corrugated bellows 50 and 51 are elastic and can compensate for an axial movement of the components with respect to one another by deformation. This is shown in FIG. 2, which illustrates the pneumatic actuating device 10 from FIG. 1, but with the friction clutch worn. The corrugated bellows can additionally also compensate for a relative movement during an actuating operation in order to provide permanent dirt shielding.

Figure 3:
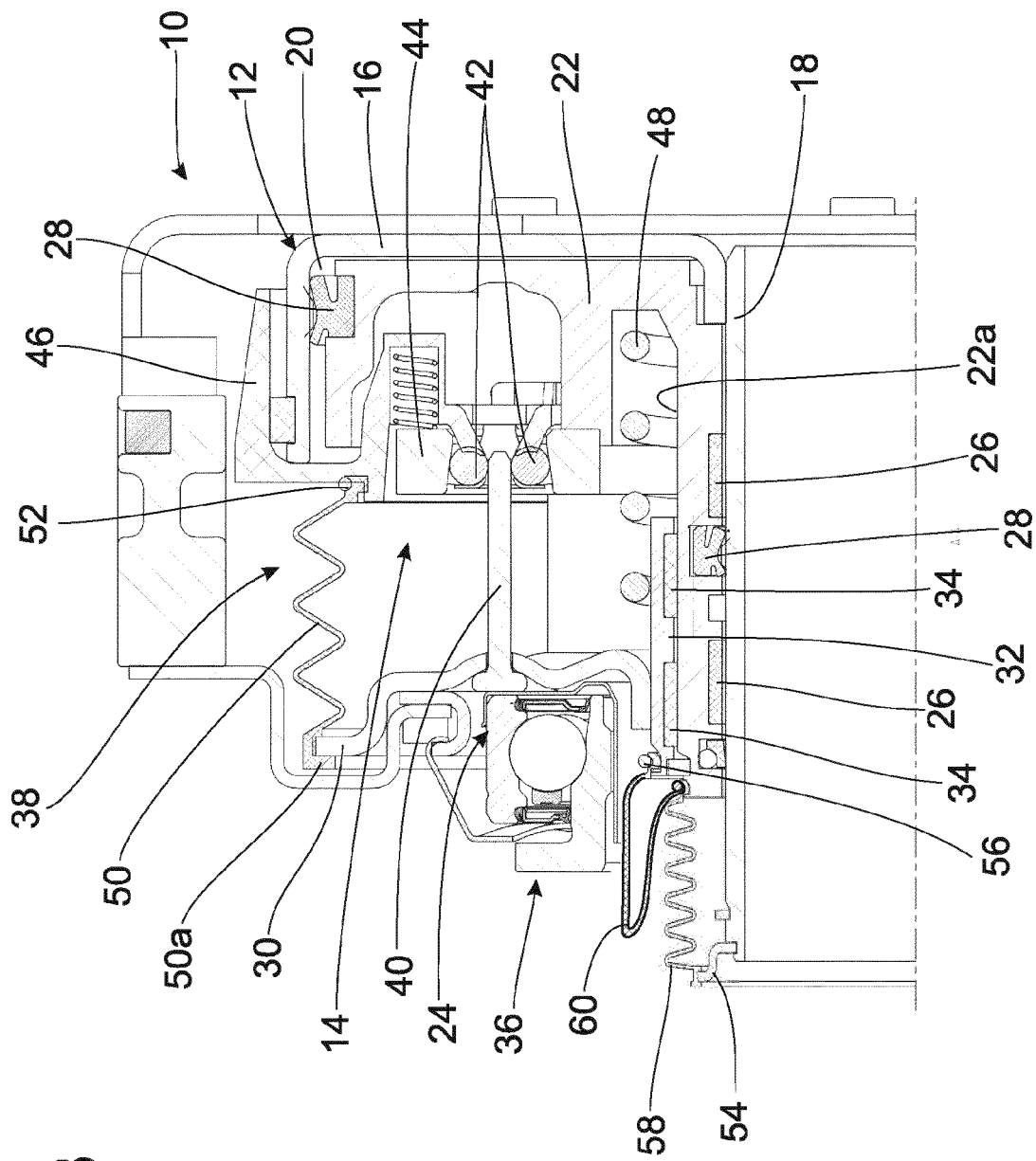
FIG. 3 is a pneumatic actuating device.

FIG. 3 substantially illustrates the same pneumatic actuating device 10 as in FIGS. 1 and 2. It differs merely in terms of the shielding elements 50. Reference signs for identical components have accordingly been adopted from the preceding figures.

The shielding element 51 is replaced by two shielding elements 58 and 60. The shielding element 58 is, on the one hand, arranged indirectly on the guide tube 18 and, on the other hand, connected directly to the main piston 22. The configuration of the fastening is identical to that of the shielding element 51. However, the shielding element 58 is now fastened to the main piston 22 and not to the actuating piston 24. Like the shielding element 51, the shielding element 58 is designed as a corrugated bellows.

The further shielding element 60 is arranged, on the one hand, on the main piston 22 and, on the other hand, on the guide element 32 of the actuating piston 24. Here, this shielding element 60 is configured as a rolling bellows that can correspondingly roll up or down in the axial direction in order to permanently provide dirt shielding during an axial relative movement between the two partial pistons 22, 24.

Figure 4:
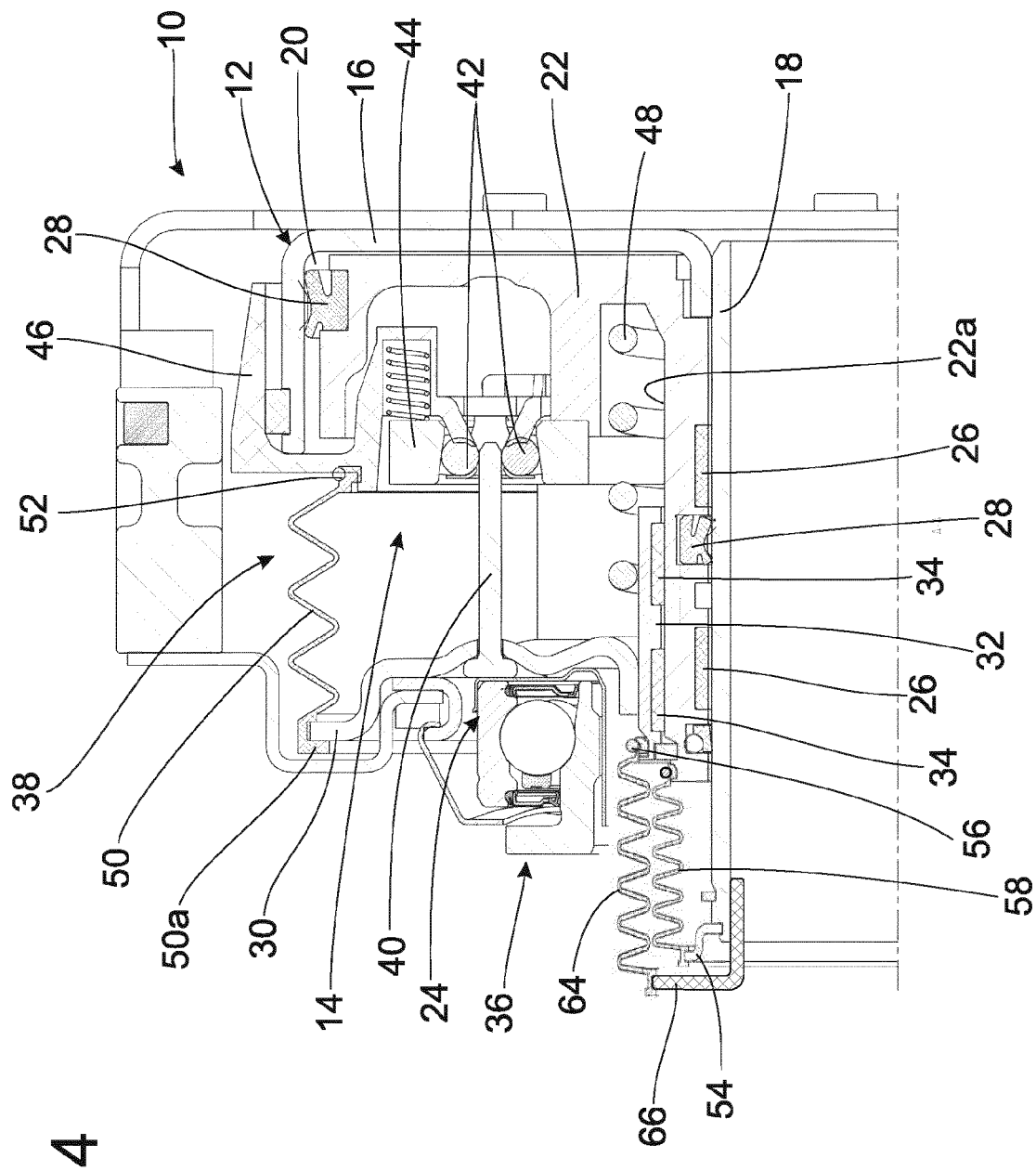
FIG. 4 is a pneumatic actuating device.

FIG. 4 shows a further modification of the pneumatic actuating device 10 starting from FIG. 3. Here, the shielding element 60 is replaced by the shielding element 64. This shielding element 64 is formed by a corrugated bellows. On the one hand, the shielding element 64 is arranged on the actuating piston 22, in particular on the guide element 32, via a clamping ring. On the other hand, the shielding element 64 is arranged indirectly on the housing 12, in particular on a further supporting element 66 which is fixedly connected to the guide tube 18. This provides multistage shielding which significantly further hampers penetration of dirt, in particular into the space between the guide tube and main piston.

A further embodiment shown in FIG. 5 and in an associated enlarged illustration according to FIG. 6. The radially inner shielding element 68 is formed by a telescopic sleeve 68. The telescopic sleeve is formed from three plastic sleeves 74, 76, and 78 that can be displaced with respect to one another in the axial direction. Stops 74a, 76a, and 76b and also 78a are formed on the plastic sleeves, run around in the circumferential direction, undercut one another and thus allow captive fastening to one another. In addition, a stop 74b is formed on the plastic sleeve 74, said stop engaging in a peripheral groove on the housing 12, in particular the guide tube 18. The first plastic sleeve 74 is thus fixedly connected to the housing 12. The plastic sleeve 78 has a main piston-side portion 78b which likewise engages in a peripheral groove of the main piston 22. As a result, the plastic sleeve 78 is fastened captively and can nevertheless still execute a telescopic movement with respect to the main piston 22. The groove 22b is configured to be correspondingly longer in the axial direction than a width of the portion.

The radially outer shielding element 80 is formed by a plastic sleeve fastened to a groove of the actuating piston 24 via a snap connection. This shielding element 80 has merely to be pushed on for fastening purposes. A felt is formed on the housing side and runs along the housing 12 in a dirt-repelling manner.

FIG. 7 shows a detail of a pneumatic actuating device 10, to be precise the radially outer shielding element 70. The remainder of the structure is identical to that of FIG. 1. The shielding element 70 is designed in the form of a corrugated bellows which is secured, on the one hand, to the flange 30 and, on the other hand, to the working cylinder 16 of the housing 12. On the housing side, the shielding element 70 is secured via a clamping ring 72. By virtue of such a design, not only the space of the clamping device 38 but also the dirt shielding for the pressure chamber is taken over by a single shielding element 70.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An actuating device for a motor vehicle, comprising:
   a housing is of multipart design and comprises a working cylinder and a guide tube fixedly connected to the working cylinder;
   a multipart working piston that is movable in relation to the housing, comprising:
      a main piston; and
      an actuating piston configured to actuate a friction clutch,
      wherein the main piston and the actuating piston are configured to be axially movable with respect to one another for wear compensation and are each configured as a partial piston of the multipart working piston;
   a clamping device configured to clamp the main piston and the actuating piston against one another to fix an operative length of the multipart working piston; and
   a shielding element configured to protect the actuating device from dirt arranged in one of:
      the housing and the main piston;
      the housing and the actuating piston;
      the main piston and the actuating piston;
      one of the main piston and the actuating piston; and
      the actuating piston and the clamping device.

2. The actuating device as claimed in claim 1, wherein the shielding element is one of a corrugated bellows, a rolling bellows, and a telescopic sleeve.

3. The actuating device as claimed in claim 2, wherein the telescopic sleeve is formed by a plurality of plastic sleeves.

4. The actuating device as claimed in claim 2, wherein at least one of a first portion of the shielding element and a second portion of the shielding element engages in a securing formation.

5. The actuating device as claimed in claim 4, wherein at least one of the housing, the main piston, the actuating piston and the clamping device comprises:
   a supporting element on which the shielding element is captively arranged.

6. The actuating device as claimed in claim 5, wherein at least one of the first portion of the shielding element and the second portion of the shielding element is captively fastened via a securing element.

7. The actuating device as claimed in claim 6, wherein the telescopic sleeve is formed by a plurality of plastic sleeves.

8. The actuating device as claimed in claim 1, wherein at least one of a first portion of the shielding element and a second portion of the shielding element engages in a securing formation.

9. The actuating device as claimed in claim 1, wherein at least one of the housing, the main piston, the actuating piston and the clamping device comprises:
   a supporting element on which the shielding element is captively arranged.

10. The actuating device as claimed in claim 1, wherein at least one of a first portion of the shielding element and a second portion of the shielding element is captively fastened via a securing element.

11. The actuating device as claimed in claim 1, wherein the actuating device is a concentric actuation device for the friction clutch.

12. The actuating device as claimed in claim 1, wherein the actuating device is configured to concentrically surround a drive shaft.

\* \* \* \* \*